(12) United States Patent
Schmid

(10) Patent No.: US 7,024,860 B2
(45) Date of Patent: Apr. 11, 2006

(54) GAS-TURBINE INSTALLATION

(75) Inventor: Udo Schmid, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 3 days.

(21) Appl. No.: 10/909,805

(22) Filed: Jul. 31, 2004

(65) Prior Publication Data

US 2005/0086939 A1 Apr. 28, 2005

(51) Int. Cl.
*F02C 3/04* (2006.01)

(52) U.S. Cl. ...................................................... 60/726
(58) Field of Classification Search .................. 60/726, 60/269, 787
See application file for complete search history.

(56) References Cited

U.S. PATENT DOCUMENTS

| 4,077,748 A | * | 3/1978 | Potz ............................ 417/319 |
| 4,949,544 A | | 8/1990 | Hines |
| 5,680,752 A | | 10/1997 | Skog |

FOREIGN PATENT DOCUMENTS

DE 25 41 715 A1 4/1976
EP 1 128 039 A2 8/2001

* cited by examiner

*Primary Examiner*—Ehud Gartenberg

(57) ABSTRACT

In a gas-turbine installation according to the invention there is provided, in order to increase the compressor mass flow, a separate turbo-compressor which is connected in parallel to the compressor of the gas turbine and which is preferably operated by means of an electric motor. By this means, the gas turbine is, at a current ambient temperature, operated with increased power output appropriate to a lower ambient temperature.

14 Claims, 2 Drawing Sheets

GAS-TURBINE INSTALLATION

CROSS REFERENCE TO RELATED APPLICATION

This application claims priority of the European application No. 03018413.9 EP filed Aug. 13, 2003, which is incorporated by reference herein in its entirety.

FIELD OF THE INVENTION

The invention relates to a gas-turbine installation comprising a compressor assigned to a gas turbine.

BACKGROUND OF THE INVENTION

The power output by a gas-turbine installation depends greatly on the current ambient temperature. The power output falls as the ambient temperature rises; as this reduces the compressor mass flow through the gas turbine.

In order to offset this power loss of the gas-turbine installation with rising ambient temperature, it is known for the intake air of the gas turbine to be cooled, for example by evaporative cooling. However, this measure produces good results only in the case of dry ambient air and preferably high ambient temperatures. Furthermore, this measure involves a high level of water consumption.

A further known method comprises the spraying of water into the compressor of the gas turbine (wet compression). For this, however, a large quantity of fully demineralized water is needed. In addition, the service life of at least some components of the gas turbine is reduced.

It is further known for water to be sprayed into the combustion chamber of the gas turbine; this measure, however, also exhibits the aforementioned disadvantages and, furthermore, leads to a significant reduction in efficiency.

The said known measures for increasing power require the acceptance of some serious drawbacks in order for a desired increase in power to be achieved.

SUMMARY OF THE INVENTION

The object of the invention is therefore to indicate a gas-turbine installation of the type specified in the introduction, in which an increase in power is possible in a simple manner and without serious drawbacks for the continuous operation of the installation.

The object is achieved according to the invention in a gas-turbine installation comprising a compressor (gas-turbine compressor) assigned to a gas turbine, wherein a separate turbo-compressor is, in terms of flow engineering, connected to the compressor at least partially in parallel.

The separate turbo-compressor increases the mass flow of compressed air which is fed to the gas turbine. This gives rise to an increased power output of the gas-turbine installation compared to that of a gas-turbine installation without a separate turbo-compressor, while not impairing the efficiency or service life of the gas-turbine installation.

Since the power output of a gas-turbine installation decreases with rising ambient temperatures because the mass flow of compressed air is reduced, a gas-turbine installation according to the invention is, by virtue of the compressed air additionally provided by the turbo-compressor, operated at a current ambient temperature with a power output corresponding to a cooler ambient temperature.

The compressor of the gas turbine does not have to compress the additional air provided by the turbo-compressor from the ambient pressure to the final pressure required, since the turbo-compressor takes on this task, at least partially. By this means, the power output by the gas turbine rises more than proportionately to the increase in the mass flow of compressed air which flows into the turbine.

The power balance of a gas-turbine installation according to the invention is therefore positive despite the somewhat increased power requirement of the compressor and the power required to drive the turbo-compressor.

In a preferred embodiment, the turbo-compressor is driven by an electric motor.

Such drives are susceptible to few faults and are easy and fast to control and flexible to use.

Advantageously, compressed air from the turbo-compressor is fed to the compressor via means for removing compressor air, which means are included in the gas-turbine installation.

In many gas-turbine installations means for removing compressor air are necessary on operating grounds and are therefore already present, for example blow-off lines, cooling-air lines or overflow lines. These means for removing compressor air essentially serve in known gas-turbine installations either to reduce the pressure of the compressor air or to divert at least part of the compressor air in order, for example, to feed it to a cooling device.

In this embodiment of the invention the compressed air provided by the turbo-compressor is fed to the gas-turbine installation via existing means so that the basic design of the gas-turbine installation scarcely has to be changed.

In a particularly preferred embodiment the gas-turbine installation is designed as a gas and steam power installation.

In a gas and steam power installation, the energy in the hot exhaust gas of the gas turbine is utilized in a steam-generation process to generate process steam for a steam turbine.

Since, because of the increased compressor mass flow in a gas-turbine installation according to the invention the exhaust-gas mass flow of the gas turbine also rises, the power output of the steam turbine linked to the gas turbine also increases. This embodiment of the invention therefore has particularly high achievable surplus power and a good level of efficiency.

In a further preferred embodiment the turbo-compressor comprises at least two compressor stages.

It is possible in this way to achieve a desired final pressure for the compressed air particularly precisely and highly efficiently.

In this embodiment of the invention it is also advantageous if an intercooler is connected between two of the compressor stages, said intercooler preferably being fashioned as a fuel preheater.

In a multi-stage compressor the compressed air can be removed after a first compressor stage and fed to an intercooler. Where the intercooler is fashioned as a fuel preheater, a fuel mixture for the gas turbine is used as a coolant, which fuel mixture is heated by means of a heat exchange with the precompressed air. This gives rise to at least two positive effects:

Firstly, as a result of the intercooling of the precompressed air, the compressor mass flow increases further and secondly, the preheating of the gas-turbine fuel mixture is effected such that known heat exchangers previously used for this purpose can be dispensed with. If the preheating of the fuel mixture takes place behind the control valves for the fuel mixture, then a feeding device for the fuel mixture can be designed for cold gas and consequently implemented cost-effectively.

Furthermore, the required length of a pipeline which carries the fuel mixture to the fuel preheater and from there to the gas turbine is reduced by this means.

Finally, a known water circuit for heating up the fuel mixture, including all associated controls, can be dispensed with.

The intercooler is preferably supplied with coolant by means of a coolant supply assigned to a generator or to another component of the gas-turbine installation.

This embodiment can be implemented at particularly low cost if a coolant, for example cooling water, is needed for intercooling the compressed air of the turbo-compressor. This coolant can then be obtained from a coolant supply which is generally present in any case, for example for the generator, said cooling device often being installed just a few meters away.

In a further preferred embodiment, the turbo-compressor is supplied with lubricating oil by means of a lubricating-oil supply assigned to the gas turbine.

The provision of lubricating oil for running the turbo-compressor reliably and with a low rate of wear is particularly easy, since an existing lubricating-oil supply of the gas turbine can be used.

The turbo-compressor is preferably operated at its nominal power during operation of the gas-turbine installation.

Here, the turbo-compressor runs at the maximum continuous power for which it is designed.

A power control for the turbo-compressor can be dispensed with, since the control of power by changing the quantity of air can be taken over exclusively by the gas turbine.

In a further advantageous embodiment of the invention, the air compressed by the turbo-compressor is fed via a control valve to the gas turbine, whereby the control valve can be opened and closed in accordance with a control characteristic.

The additional compressed air for combustion provided for the gas turbine by the turbo-compressor is fed to the gas turbine via the control valve in accordance with a desired control characteristic, which permits, for example, a slow and steady supply or removal of the additional air for combustion when the turbo-compressor is started up and shut down. The control characteristic can, for example, be a control program for a motor which actuates the control valve.

The turbo-compressor is, for example, started with the control valve closed. As soon as the pressure in front of the control valve is greater than the pressure downstream of the compressor assigned to the gas turbine, the control valve is brought uninterruptedly from its closed position to its fully open position. This opening process can take 60 seconds, for example. Since the compressor mass flow increases sufficiently slowly, the power control can be taken over by the gas turbine alone.

The turbo-compressor can also be taken out of use, for example, by the control valve being brought uninterruptedly from its open position to its closed position, e.g. within 60 seconds. Here, too, the change in the compressor mass flow is sufficiently slow that the gas turbine alone can carry out the power control without problems by adjusting its guide vanes.

Furthermore, it is advantageous if the feed to the gas turbine of air which has been compressed by means of the turbo-compressor can be interrupted abruptly by means of a non-return valve.

In the event of a fault in the turbo-compressor, the connecting line between gas turbine and turbo-compressor must be closed as quickly as possible in order not to jeopardize the operation of the gas-turbine installation as a result of the fall in pressure occurring in the turbo-compressor train. The non-return valve is therefore provided in this embodiment in order to prevent the return flow of compressed air from the gas-turbine compressor into the turbo-compressor and thus to enable the connecting line from the turbo-compressor to the gas turbine to be interrupted abruptly, that is within the shortest time possible.

The non-return valve can preferably be hydraulically or pneumatically actuated.

Such an actuation of the non-return valve assists the closing of this valve in the event of a fault in the turbo-compressor, so that the turbo-compressor can be decoupled as quickly as possible from the gas turbine.

BRIEF DESCRIPTION OF THE DRAWINGS

Two exemplary embodiments of the invention are described in detail below with reference to the Figures in which.

DETAILED DESCRIPTION OF THE INVENTION

Figure 1:
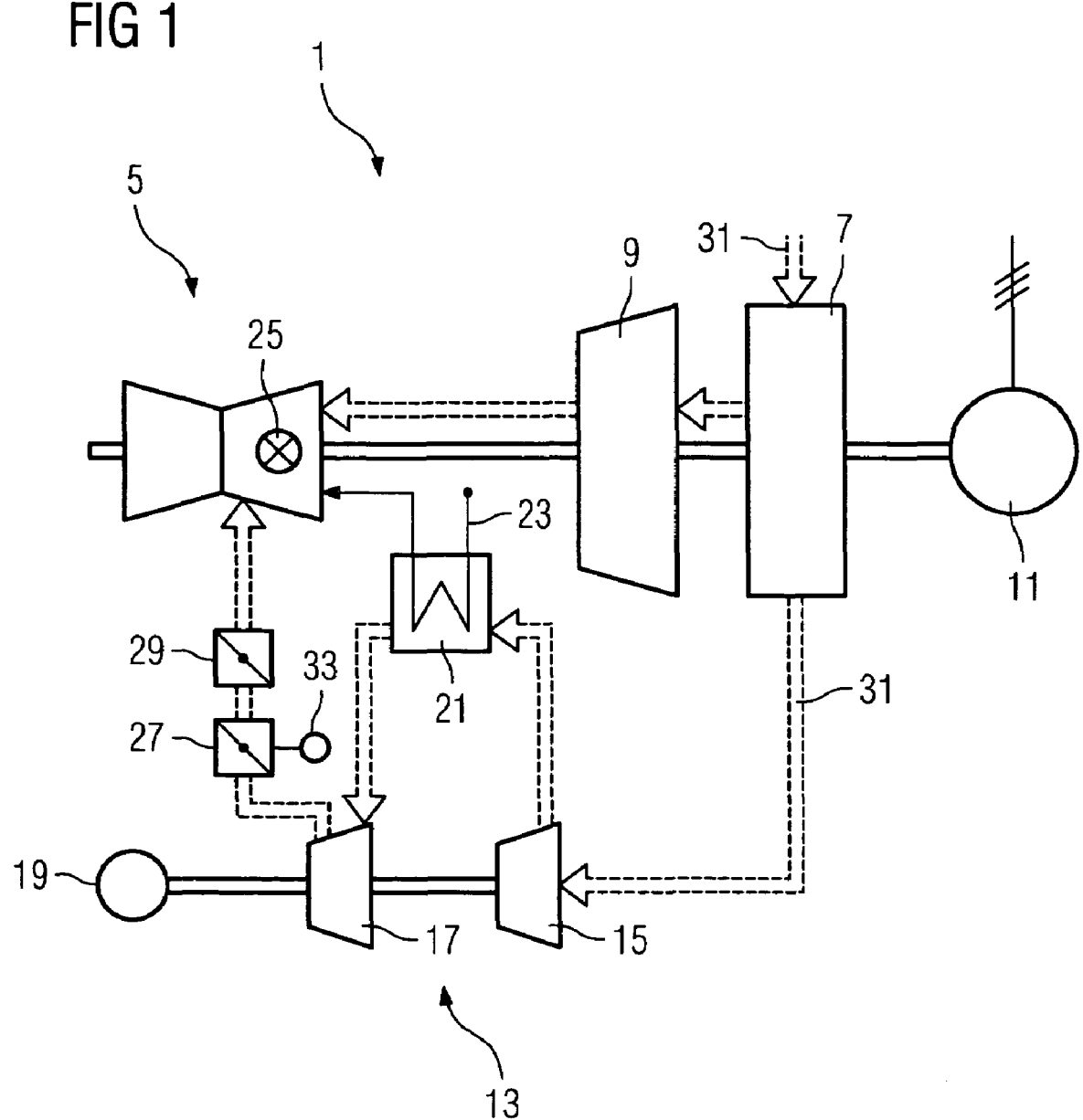
FIG. 1 shows a gas-turbine installation according to the invention comprising a compressor assigned to a gas turbine and a two-stage turbo-compressor which is connected to the compressor fully in parallel.

The Figure shows a gas-turbine installation 1 according to the invention.

It comprises a compressor 9 which is arranged together with a gas turbine 5 and a generator 11 on a common shaft.

By means of the gas turbine 5 the energy contained in a gaseous fuel is converted into rotational energy to drive the generator 11.

The combustion of the gaseous fuel in a combustion chamber 25 requires the addition of air 31 which, in order to increase the efficiency of the combustion, is compressed by means of the compressor 9 and then introduced into the combustion chamber 25.

The air 31 is drawn in by means of an intake 7 (intake housing) and fed to the compressor 9.

Arranged in parallel to the compressor 9 in the gas-turbine installation 1 is a turbo-compressor 13 which is likewise loaded with air 31.

The turbo-compressor 13 comprises a first compressor stage 15 and a second compressor stage 17.

The turbo-compressor 13 is driven by means of an electric motor 19.

After compression of the air 31 by means of the first compressor stage 15, the suitably precompressed air is fed to a fuel preheater 21 and then brought into the second compressor stage 17 for continued compression of the air 31 to a required final pressure.

The air 31 which has been compressed in this way by the turbo-compressor 13 is, after leaving the turbo-compressor 13, fed by means of a control valve 27 to the gas turbine 5, in particular to the combustion chamber 25 thereof.

The control valve 27 is actuated by a motor 33 in accordance with a control characteristic.

The control valve 27 is continuously opened and closed in particular during the startup and shutdown of the turbo-compressor 13. During operation of the gas-turbine installation 1, the control valve 27 is generally in a constant open position.

In order to be able, in the event of a failure of the turbo-compressor 13, to interrupt the return flow of air from the gas turbine 5 as quickly as possible, a non-return valve 29 is provided. This non-return valve 29 is in such a case brought abruptly to a closed position.

Figure 2:
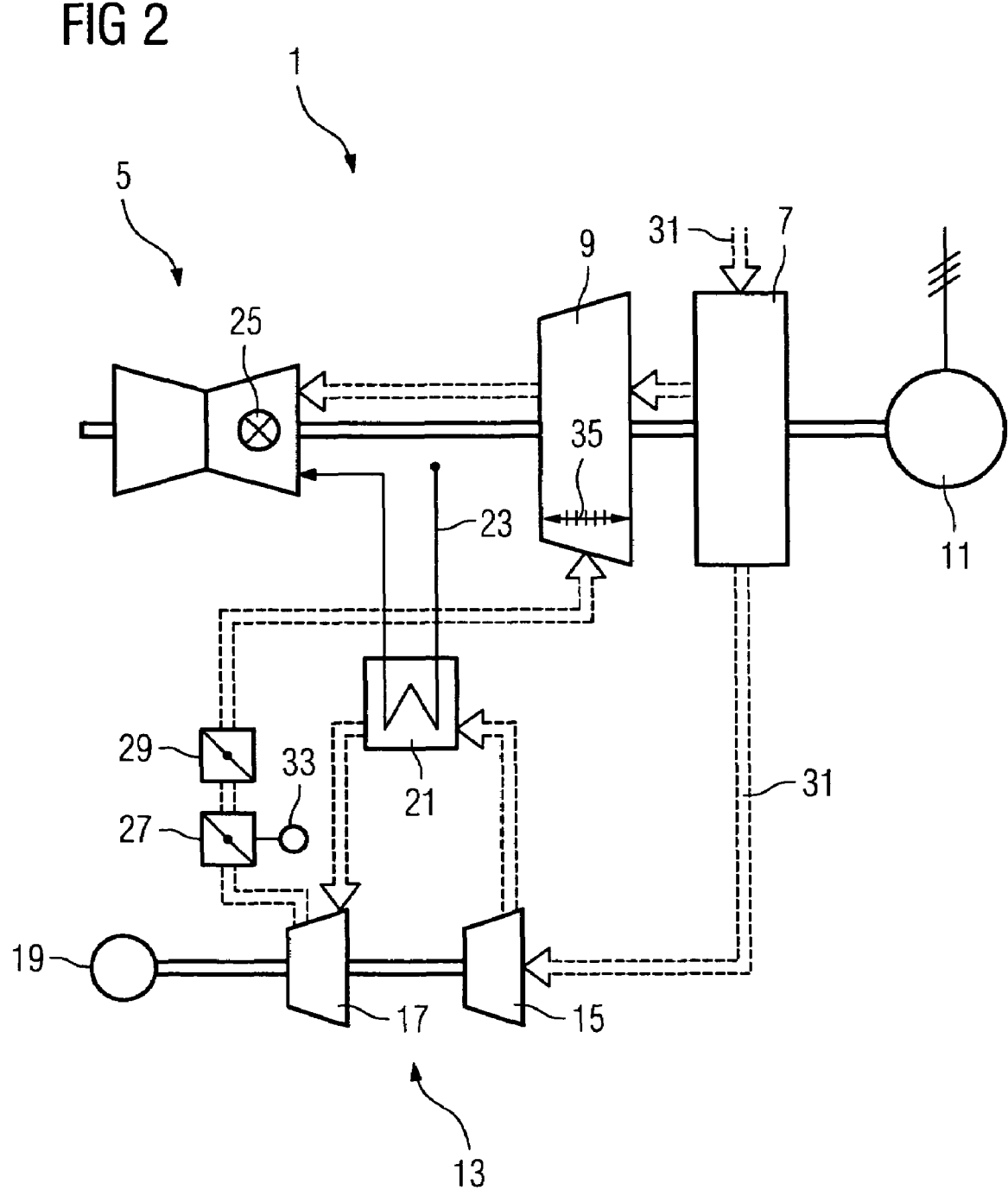
FIG. 2 shows a further gas-turbine installation according to the invention, wherein the turbo-compressor is, in terms of flow engineering, connected to the compressor partially in parallel.

FIG. 2 shows a further embodiment of the invention. In contrast to FIG. 1, the turbo-compressor 13 here is, in terms of flow engineering, connected to the compressor 9 only partially in parallel. Air compressed by the turbo-compressor 13 is fed to the compressor 9 at a defined pressure level 35 of the compressor 9. The compressor 9 then takes over further compression to a required final pressure.

In summary, a gas-turbine installation according to the invention can be described as follows:

In order to increase the compressor mass flow, there is provided in a gas-turbine installation according to the invention a separate turbo-processor, which is connected, in terms of flow engineering, at least partially in parallel to the compressor of the gas turbine, and which is operated preferably by means of an electric motor.

By this means, the gas turbine is, at a current ambient temperature, operated with increased power output appropriate to a lower ambient temperature; the power output by the gas turbine corresponds to the output of a conventional gas-turbine installation at a colder ambient temperature.

The invention claimed is:

1. A gas-turbine engine, comprising:
   a turbine;
   an air intake element;
   an external air compressor having a shaft, operatively connected to the turbine;
   a turbo-compressor connected to the air intake element and having a shaft arranged approximately parallel with the external air compressor shaft; and a non-return valve on a flowpath between the outlet of said compressor and the outlet of said turbo-compressor.

2. The gas-turbine engine according to claim 1, wherein the shaft of the turbo-compressor is rotated by an electric motor.

3. The gas-turbine engine according to claim 1, wherein the turbo-compressor supplies compressed air to the external air compressor.

4. The gas-turbine engine according to claim 3, wherein compressed air is supplied by a component selected from the group consisting of: a blow-off line, a cooling-air line, an overflow line, combinations thereof, and the like.

5. The gas-turbine engine according to claim 1, wherein the gas-turbine engine is used in conjunction with a steam power engine.

6. The gas-turbine engine according to claim 1, wherein the turbo-compressor has a plurality of compressor stages.

7. The gas-turbine engine according to claim 6, wherein an intercooler is connected between two of the compressor stages.

8. The gas-turbine engine according to claim 7, wherein the intercooler functions as a fuel pre-heater.

9. The gas-turbine engine according to claim 8, wherein the intercooler is supplied with a coolant by a coolant supply associated with a generator or another component of the gas-turbine engine.

10. The gas-turbine engine according to claim 1, wherein the turbo-compressor is supplied with lubricating oil by a lubricating-oil supply associated with the gas turbine.

11. The gas-turbine engine according to claim 1, wherein the turbo-compressor is operated at nominal power during operation of the gas-turbine engine.

12. The gas-turbine engine according to claim 1, wherein the air compressed by the turbo-compressor is supplied through a control valve to the gas turbine and the control valve is opened and closed according to a control characteristic.

13. The gas-turbine engine according to claim 1, a return flow of the air compressed by the compressor to the turbo-compressor can be interrupted by means of said non-return valve.

14. The gas-turbine engine according to claim 13, wherein the non-return valve is actuated either hydraulically or pneumatically.

* * * * *